United States Patent [19]
Engle

[11] Patent Number: 5,815,823
[45] Date of Patent: Sep. 29, 1998

[54] MICROPROCESSOR CONTROLLED RAILWAY CAR ACCOUNTING AND COMMUNICATION SYSTEM

[75] Inventor: Thomas H. Engle, Clayton, N.Y.

[73] Assignee: Westinghouse Air Brake Company, Wilmerding, Pa.

[21] Appl. No.: 772,326

[22] Filed: Dec. 23, 1996

[51] Int. Cl.[6] ................................................ G06F 7/70
[52] U.S. Cl. ........................... 701/19; 701/33; 246/187 C
[58] Field of Search .................................. 701/19, 20, 33; 105/61; 246/182 R, 182 B, 187 C, 167 R; 305/3, 15, 20; 364/131, 132

[56] References Cited

U.S. PATENT DOCUMENTS

4,401,035  8/1983  Spigarelli et al. ........................ 701/33
5,475,818 12/1995  Molyneaux et al. ...................... 701/20

Primary Examiner—Jacques H. Louis-Jacques
Attorney, Agent, or Firm—James Ray & Associates

[57] ABSTRACT

Apparatus by which a controlling information processing unit can communicate individually with subordinate information processing units which are connected sequentially along a pair of electrical conduction paths. The controlling unit assigns a unique address to each subordinate unit, which it uses later for communication with individual subordinate units. The controlling unit controls an electrical current in the pair of conduction paths. Each subordinate unit has a shunt path which has a current sensor and a switch, so the subordinate unit can open or close the path. All of the switches on the shunt paths are initially closed. In each subordinate unit, the shunt current is measured, and a high value indicates that the shunt is closer to the controlling unit than any other subordinate unit which has a closed switch. The subordinate unit then receives its address from the controlling unit, stores its address, and opens its switch. Opening the switch in any unit causes an increase in shunt current in the next unit, and the address assigning process is repeated for that unit. Later, the controlling unit uses the addresses to command subordinate units individually.

23 Claims, 7 Drawing Sheets

MICROPROCESSOR CONTROLLED RAILWAY CAR ACCOUNTING AND COMMUNICATION SYSTEM

FIELD OF THE INVENTION

The present invention relates, in general, to initialization of communications between a controlling information processing unit and subordinate information processing units, and more particularly relates to initialization of communications between a controlling information processing unit on a controlling locomotive and subordinate information processing units on controlled railway vehicles in a consist of coupled railway vehicles.

BACKGROUND OF THE INVENTION

The following terms from the art are defined here for us in this application:

Railway vehicle—Locomotive or any other rolling stock.

Consist of coupled railway vehicles—Group of railway vehicles coupled together, as in a train. Can be a group of coupled railway vehicles in a switchyard which are not ready for travel.

Consist of locomotives—A group of locomotives coupled to each other with no vehicles other than locomotives intervening.

Trainline—Any communication line (pneumatic, electrical, etc) connected from vehicle to vehicle through a consist of coupled railway vehicles.

Brakepipe—A pneumatic trainline for control of brakes.

Electrical trainline—An electrical communication line connected from vehicle to vehicle through a consist of coupled railway vehicles.

Trainline cable—A multistrand electrical cable connected from vehicle to vehicle through a consist of coupled railway vehicles.

Locomotive trainline—A multistrand electrical cable which controls throttle, dynamic braking, etc in a locomotive. The locomotive trainline may be connected between locomotives in a consist of locomotives so one locomotive controls throttle, dynamic braking, etc in the other locomotives.

Lead Locomotive—The locomotive at the front end of a train.

Controlling Locomotive—The locomotive from which the train is controlled. (Usually the lead locomotive.)

Controlled Locomotive—A locomotive controlled by a controlling locomotive.

Remote Locomotive—A controlled locomotive separated from the controlling locomotive by one or more railway vehicles which are not locomotives.

Remote Railway Vehicle—A railway vehicle separated from the controlling locomotive by one or more other railway vehicles.

An early example of communication between railway vehicles in a consist of coupled railway vehicles is the air brake system, which is derived from the classical Westinghouse airbrake. In this system, a locomotive controls brake application on the railway vehicles to which it is coupled through a pneumatic trainline, which is referred to as the brakepipe. The brakepipe is connected from vehicle to vehicle down the length of the consist. This system has a high degree of reliability because if the brakepipe fails, brakes are applied throughout the consist.

The air brake system signals a need for brake application by a pressure reduction initiated by the locomotive. One problem with this system is that some time is needed for a pressure reduction to be propagated down the line of railway vehicles, about a minute for a mile-long train. Hence, there is considerable delay in the application of brakes on vehicles in the back of a long train.

One method of providing a more rapid brake response is to transmit by radio a command for brake application from the controlling locomotive to a receiver in a remote locomotive or other remote vehicle. In response, the remote vehicle opens a valve to exhaust brakepipe air, lower the pressure of the brakepipe in its vicinity, and hence accelerate the application of brakes. An example of this is the WABCO EPIC® system.

One difficulty with radio systems is that terrain may intervene between the controlling locomotive and the remote vehicle which exhausts the air. In that case, radio communication may be interrupted, air is not exhausted from the brakepipe by the remote vehicle, and brake application is not accelerated.

In some systems, electrical cables are used, which are connected from vehicle to vehicle down the length of the train. These carry signals from the controlling locomotive to the remote vehicle to apply brakes, release brakes, or to signal an emergency brake application. Examples of these are the WABCO MC30A/CS-1, the WABCO 26-C/CS-2, and the New York Airbrake system, the NYAB PS-68. Each of these systems uses a cable with three strands, plus ground. The signal on each line is a digital binary signal, which, at any time, is either on or off.

Another example of communication between railway vehicles in a train of coupled railway vehicles is the control of a consist of locomotives from one locomotive in the consist. In the prior art, this is accomplished through a locomotive trainline which has a large number of strands. Most of these are digital, either on or off. The locomotive trainline is connected to other locomotives in the consist of locomotives, but is not connected to the remainder of the train.

All of the systems cited above communicate only a small amount of information, generally the immediate requirements of the train for power or braking. Typically, the information communicated is transmitted at a rate of less than one baud. Also, there is no simple method of providing for the communication of new types of information. There is, for example, no method for the controlling locomotive to interrogate the individual railway vehicles as to their gross weight, condition of brakes, nature of cargo, etc.

Various proposals are currently under consideration for a system in which a microprocessor is located on each railway vehicle of the train. Each of these microprocessors would be controlled by a controlling microprocessor in the controlling locomotive. Information would be communicated between these by an electrical trainline with a very small number of strands, which carry digital signals at a relatively high baud rate. An addressing method is needed so that the controlling microprocessor can individually address any subordinate microprocessor in any railway vehicle in the consist. One method which has been considered is to manually input addressing information for all the railway vehicles in the train. This would be very difficult to accomplish for freight trains because of the large number of railway vehicles in the train, and because individual railway vehicles are frequently dropped from or added to the train.

There is clearly a need for an apparatus whereby the controlling microprocessor can communicate individually with a subordinate microprocessor on any controlled railway vehicle in the train, to establish addressing information, and obtain data from each subordinate microprocessor such as gross weight of the vehicle, etc.

This requirement may be generalized to the requirement that a controlling microprocessor be able to interrogate subordinate microprocessors connected to it and controlled by it, to obtain addressing information, and to obtain information regarding the subordinate microprocessor, or about equipment to which it is connected.

For example, a desktop computer has a controlling microprocessor (generally on a motherboard), and optional microprocessors formed on circuit boards connected to the controlling microprocessor through the bus of the computer. Various methods such as dip switches have been used to enable the controlling microprocessor to address the circuit boards individually. There clearly is a need for an automatic system for the controlling microprocessor to interrogate the individual subordinate microprocessors on the circuit boards, to establish addresses for them, and to determine their character.

SUMMARY OF THE INVENTION

The present invention provides an apparatus by which a controlling information processing unit, for example, a solid state digital microprocessor, can communicate individually with any one of a number of subordinate information processing units which are placed sequentially along and connected to a pair of primary electrical conduction paths. The apparatus enables the controlling information processing unit to assign a unique address to each subordinate information processing unit, the address to be used subsequently by the controlling microprocessor to send commands, information, requests for information, etc to individual subordinate information processing units.

The system has an information communication channel which connects all of the subordinate information processing units to each other, and to the controlling information processing unit. Both the controlling information processing unit and the subordinate information processing units have means for placing signals on the information communication channel and for receiving signals placed on the information communication channel by other units.

An electrical current generator is connected to and controlled by the controlling information processing unit. It places an electrical current on a first one of the pair of primary electrical conduction paths, and receives a return current from the other.

Each subordinate information processing unit is connected to a shunt electrical conduction path which carries a shunt electrical current from the first of the pair of primary electrical conduction paths to the other. Each shunt path has a current measuring device and a switch which has an open position and a closed position, the switch being controlled by the subordinate information processing unit. Means are provided for placing all of the switches on the shunt electrical conduction paths in a closed position before the addresses of the subordinate information processing units are assigned.

Means are provided in each subordinate information processing unit for comparing the value of the shunt electrical current in the shunt path to which it is connected with a predetermined shunt current value. The predetermined shunt current value is based on the value of resistance in the shunt current path, in relation to the resistance of a segment of the pair of primary electrical paths which lies in between the connection points for two adjacent shunt current paths.

The predetermined shunt current value is so chosen that only the shunt path which is closest along the pair of primary electrical conduction paths to the electrical current generator exceeds the predetermined shunt current value. In the event that, for a given shunt path, the shunt current value exceeds the predetermined shunt current value, the subordinate information processing unit to which it is attached accepts and stores in its memory an address signal sent by the controlling information processing unit. It then opens the switch in the shunt conduction path to which it is connected. This causes an increase in the shunt current value in the next shunt current path, so it exceeds the predetermined shunt current value, and repeats the process of receiving an address from the controlling information processing unit; This is repeated for all of the subordinate information processing units, until each of them has received an address from the controlling information processing unit.

OBJECTS OF THE INVENTION

It is therefore a primary object of the present invention to provide a practical system by which a controlling information processing unit can establish individual communications with subordinate information processing units to which it is connected.

It is an additional object of the present invention to provide a practical system by which a controlling information processing unit connected to a number of subordinate information processing units can assign and send a unique address to each individual subordinate information processing unit.

It is a further object of the present invention to provide a practical system by which a number of subordinate information processing units connected to a controlling information processing unit through an information communication channel can each identify its own individual address when its individual address is sent on the information communication channel by the controlling microprocessor, and to place the address in an information retaining means in the subordinate information processing unit.

It is a yet further object of the present invention to provide a practical system by which a controlling information processing unit can assign and transmit unique addresses to a number of subordinate information processing units to which it is connected, so that it can then individually signal each of the subordinate information processing units to send it information concerning a description or identifying label of the subordinate information processing unit, or a description or identifying label for equipment to which it is connected.

It is an object of the present invention to provide an apparatus by which a controlling information processing unit can assign addresses to individual subordinate information processing units in an automated fashion without requiring time-consuming operator input.

It is a further object of the present invention to provide an apparatus by which a controlling information processing unit can assign addresses to individual subordinate information processing units to which it is connected without introducing errors due to operator input.

It is an additional object of the present invention to provide an apparatus which can assign addresses and record the location of the controlled units in both the controlling and controlled units, the assignment of addresses of the controlled units in the group of such units under the control of the controlling unit.

It is still another object of the present invention to provide a system by which a controlling information processing unit on a controlling locomotive in a consist of railway vehicles can establish communications with individual subordinate information processing units in the individual railway vehicles in the consist.

It is a further object of the present invention to provide an apparatus by which a controlling information processing unit on a controlling locomotive can send locomotive control commands to a controlled locomotive through an electrical trainline having a small number of electrical conduction paths.

Another object of the present invention is to provide an apparatus by which a controlling information processing unit on a controlling locomotive can send locomotive control commands to a remote locomotive through an electrical trainline having a small number of electrical conduction paths.

Yet another object of the present invention is to provide an apparatus by which a controlling information processing unit on a controlling locomotive can send brake control commands to a remote railway vehicle.

Yet still another object of the present invention is to provide an apparatus by which a controlling information processing unit on a controlling locomotive in a consist of coupled railway vehicles can interrogate individual railway vehicles in the consist for information specific to each remote railway vehicle.

It is yet another object of the present invention to provide an apparatus by which a controlling information processing unit can establish communications with optional controlled information processing units to which it is connected.

It is a further object of the present invention to provide an apparatus by which a controlling information processing unit can provide address information to optional controlled information processing units to which it is connected.

In addition to the various objects and advantages of the present invention which have been generally described above, there will be various other objects and advantages of the invention that will become more readily apparent to those persons who are skilled in the relevant art from the following more detailed description of such invention, particularly, when such detailed description is taken in conjunction with the attached drawing figures and with the appended claims.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the figures, for the sake of clarity and understanding of the invention.

Figure 1:
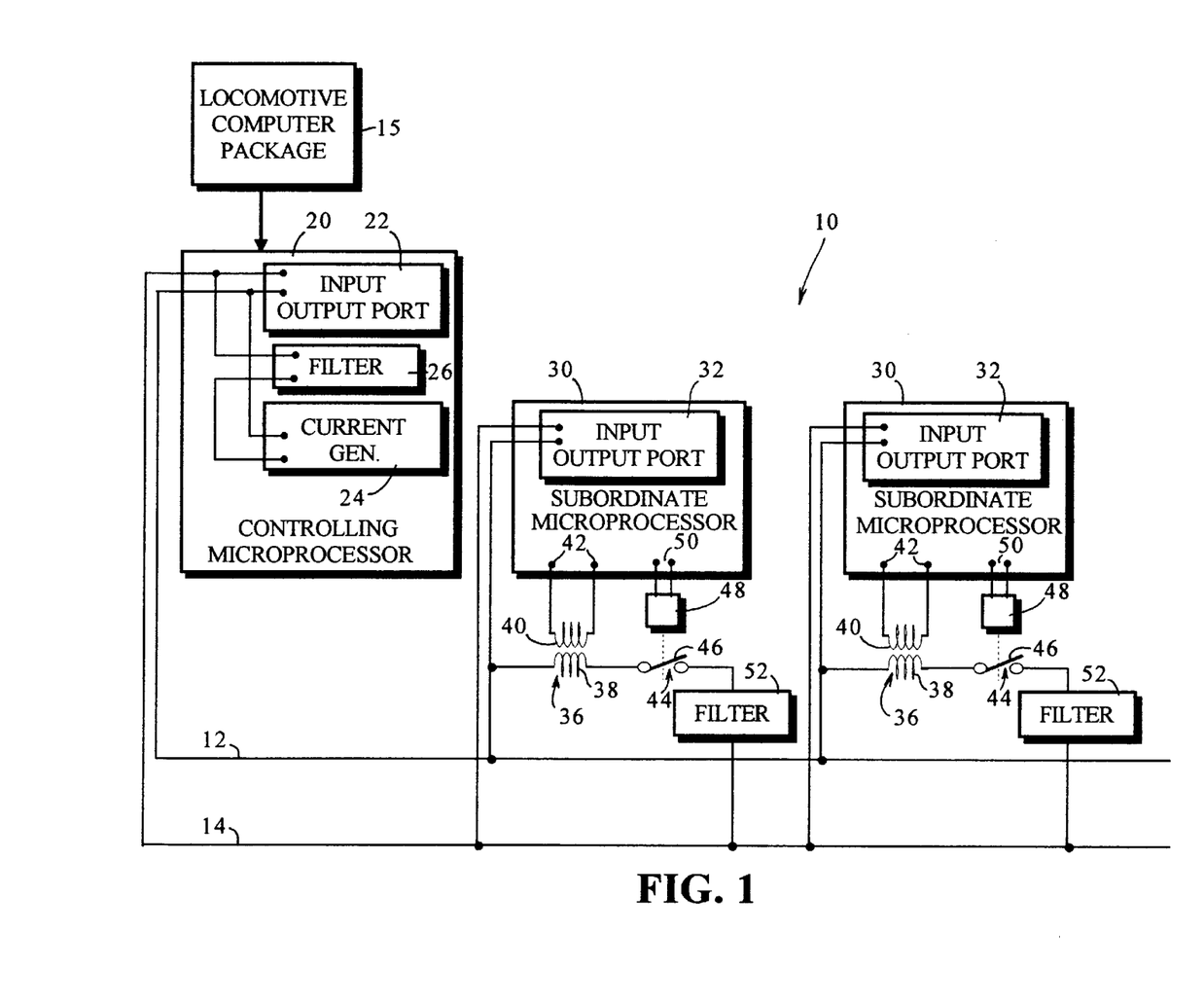
FIG. 1 is a schematic illustration of a first embodiment of the invention.

FIG. 1 shows a schematic illustration of a presently most preferred embodiment of the invention. The apparatus, generally denoted 10 has a controlling microprocessor 20 which is in communication with a locomotive computer package, 15. The controlling microprocessor 20 has an input-output port 22. Controlling microprocessor 20 also has a current generator 24 which places an electrical current on primary electrical conduction paths 12 and 14. The current produced may be DC or a low AC frequency. Signals processed by the input-output port 22 are voltage signals in a range of frequencies substantially higher than the relatively low AC frequency (or DC) of the generator. Filter 26 prevents the high frequency signals from being shorted out through the generator. Filter 26 may be a low-pass filter, such as a coil, or a filter tuned to pass the (low) frequency of the generator. Filter 26 may not be needed if the generator has sufficient inductive reactance that it acts as a low-pass filter and blocks the high-frequency signals.

Controlling microprocessor 20 is connected to subordinate microprocessors 30 through primary electrical conduction paths 12 and 14. Each subordinate microprocessor 30 has input-output port 32 which receives high frequency voltage signals from the primary electrical conduction paths 12 and 14 and supplies them to logical means in microprocessor 30. The input-output port 32 also places high frequency voltage signals on the primary electrical conduction paths 12 and 14, based on information supplied by logical means in microprocessor 30.

Each subordinate microprocessor 30 has connections to a shunt current path which includes the primary coil 38 of current transducer 36. It also includes switch 44 which opens and closes the shunt circuit, and it includes a filter 52. Filter 52 blocks the high frequency voltage signals on the primary electrical conduction paths 12 and 14, while passing the shunt current. If the shunt current is a low frequency AC signal, the shunt circuit, including coil 38 and filter 52 may be tuned to pass the frequency of the shunt current, while blocking all other frequencies, including the high frequencies of the voltage signals.

A signal induced in secondary coil 40 of current transducer 36 is passed through inputs 42 to microprocessor 30. The current transducer 36 may be a current transformer having a secondary coil 40 which supplies a current signal to inputs 42. Instead, coil 40 may be a voltage pickup coil which supplies a voltage signal to inputs 42, the voltage signal indicating a change rate of the shunt current, and hence indicating the shunt current. It is preferred that the current transducer 36 be a magnetic coil type, as shown, rather than a resistive type because it is desirable to keep the shunt resistance as low as possible.

The shunt resistance value should be small in comparison to the resistance of that portion of the primary electrical conduction paths 12 and 14 which lie between adjacent subordinate microprocessors 30. This is necessary so that when a shunt path is closed, the greatest portion (as predetermined by design) of the current signal which reaches the location of that shunt is passed through the shunt, and not passed further down the train.

For a specific example only, for the railroad application, the primary electrical conduction paths could be #12 wire. This has a resistance of 1.7 or 1.8 Ohms per 1000 feet. A fifty foot length of this would have a resistance of 0.0875 Ohms. If the return path is another wire of the same size, the total resistance from one shunt to the next, in 50 feet, would be 0.175 Ohms. The resistance of the shunt current path, including the primary side of the current transducer 36, the switch 44 and the filter 52 should be significantly less than this, for example, an absolute minimum of 0.0175 Ohms.

It should be noted that if the current transducer 36 has inductive reactance, then that reactance needs to be included in the determination of the values of reactive components of filter 52. If the inductive reactance of transducer 36 is large enough, filter 52 may simply be a capacitor which, placed in series with primary coil 38 forms a series tuned circuit, which passes only the frequency of the current signal.

Switch 44 has a moveable portion 46 which is moved to an open position by coil 48 which is attached to terminals 50 of subordinate microprocessor 30. It is moved to a closed position by gravity, spring loading, or any other convenient means. This switch is controlled by subordinate microprocessor 30 by a signal from terminals 50.

The sending of the address signal for any subordinate information processing unit 30 must be done after the switch 44 in the shunt path of the previous subordinate information processing unit has been opened. One method of doing this is for the controlling information processing unit 20 to wait a predetermined time after it sends each address signal before it sends the next address signal.

Another method is for the subordinate information processing unit which senses a shunt current exceeding the predetermined shunt current value to send a voltage signal via input-output port 32 and the pair of primary electrical conduction paths 12 and 14 indicating that it is ready to receive an address from the controlling information processing unit 20.

Means are provided for determining when all of the subordinate information processing units have received an address, at which time the apparatus activates an operating mode of the controlling microprocessor. Activation of the operating mode may be done as follows. When the last railway vehicle in the consist has a current through its shunt resistor which exceeds the predetermined shunt current value, it accepts the next address signal and stores it in its information retaining means. It then opens the switch in the shunt current path to which it is connected. This eliminates the last of the shunt current paths, so the electric current which the controlling information processing unit places on the primary electrical conduction paths is interrupted. The controlling information processing unit interprets this event as indicating that all the railway vehicles in the consist have been assigned their addresses, and it then changes over to the operating mode. It should be noted that it is not necessary for the vehicle at the end of the consist to have information that it is located at the end of the consist, because its response to the high shunt current condition is the same as that of any other of the subordinate information processing units.

At some point before the system becomes fully operational, the subordinate information processing units must send data defining themselves to the controlling information processing unit. For example, each railway vehicle in the contiguous railroads of North America have unique alphameric labels which tell which railroad they belong to, and which vehicle in that railroad they are. This designator is referred to as the WRU, a telegraph abbreviation for "Who Are You?". They may also send other information such as gross weight, nature of cargo, etc.

This may be done by each of the subordinate information processing units as soon as it receives its address from the controlling information processing unit. This may also be done for all the units after they have all received address information. In this case, the controlling information processing unit would send a signal indicating a request for information, and an address, to each of the subordinate information processing units.

Figure 2:
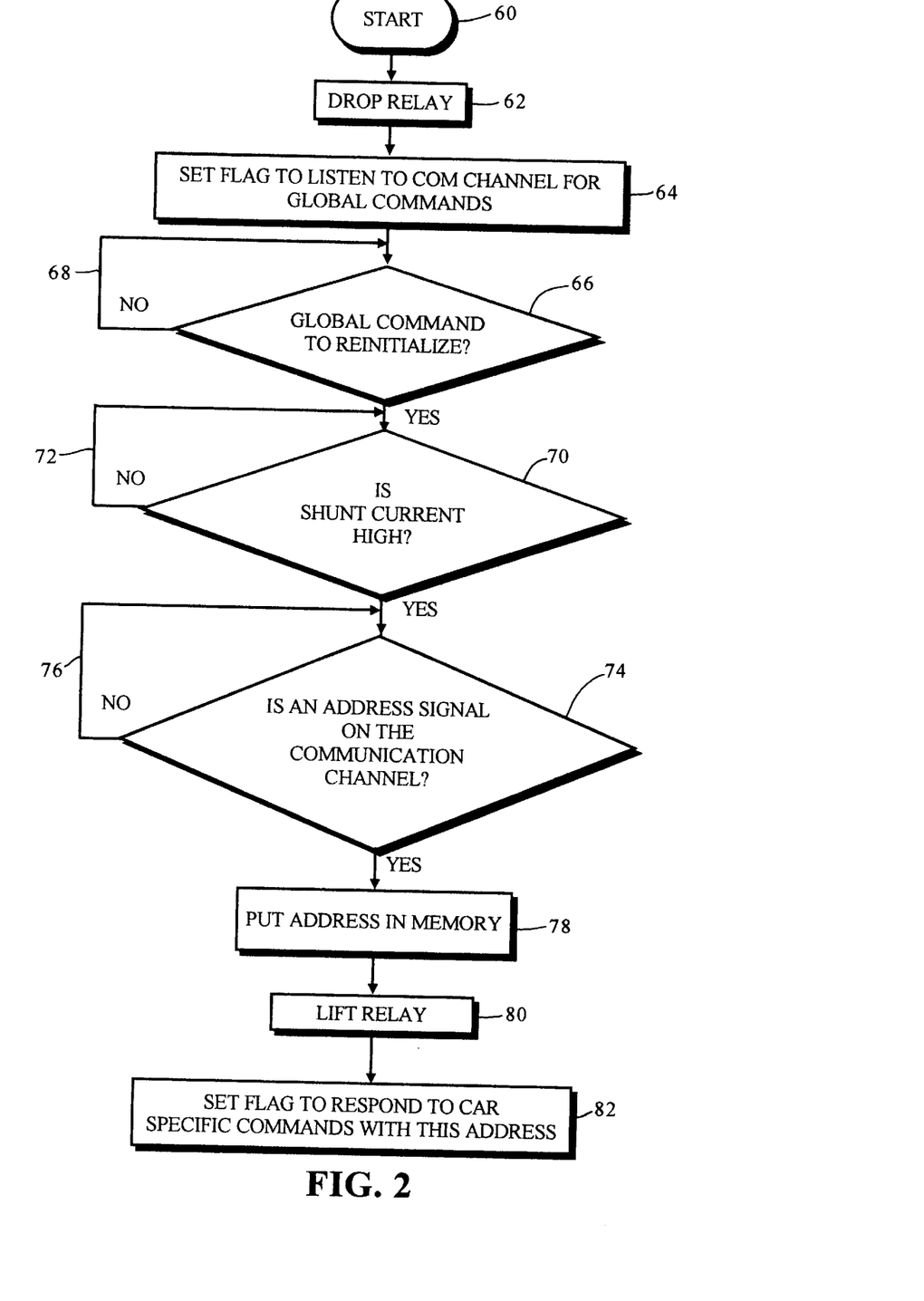
FIG. 2 is a flowchart showing the basic features of the logical operation of the carborne portion of this invention, for the embodiment shown in FIG. 1.

FIG. 2 is a flowchart which illustrates the logical operation of the initialization routine for the subordinate information processing units 30.

After starting at 60, the program, at the step denoted 62, directs the coil 48 to drop moveable portion 46 and hence close switch 44. At 64, it sets a flag to listen to the communication channel (the voltage signal on primary electrical conduction paths 12 and 14) to detect a global command to initialize. Until it receives a signal to initialize, it loops through feedback path 68. When it receives the signal to initialize, it proceeds to step 70 where it compares the shunt current value with a predetermined shunt current value. If the shunt current exceeds the predetermined shunt current value, that indicates that all shunt paths between the subordinate microprocessor 30 and the controlling microprocessor 20 are in the open position. Until that is the case, it loops through feedback path 72.

When the shunt current exceeds the predetermined shunt current value, the logic proceeds to 74, where it listens for an address signal from the controlling microprocessor 20 on the communication channel. Until it receives such a signal, it loops through feedback path 76. When it receives an address signal, it accepts it as pertaining to itself, and places it in its memory or other information retaining means. It then lifts the relay, switch 44 so that the electrical current on the pair of primary electrical conduction paths 12 and 14 flows down to the shunt path associated with the subordinate microprocessor 30 in the next railway vehicle.

The program then sets a flag to respond to car specific commands with the address that it received. It still retains the capability set at 64 of responding to global commands.

Figure 3:
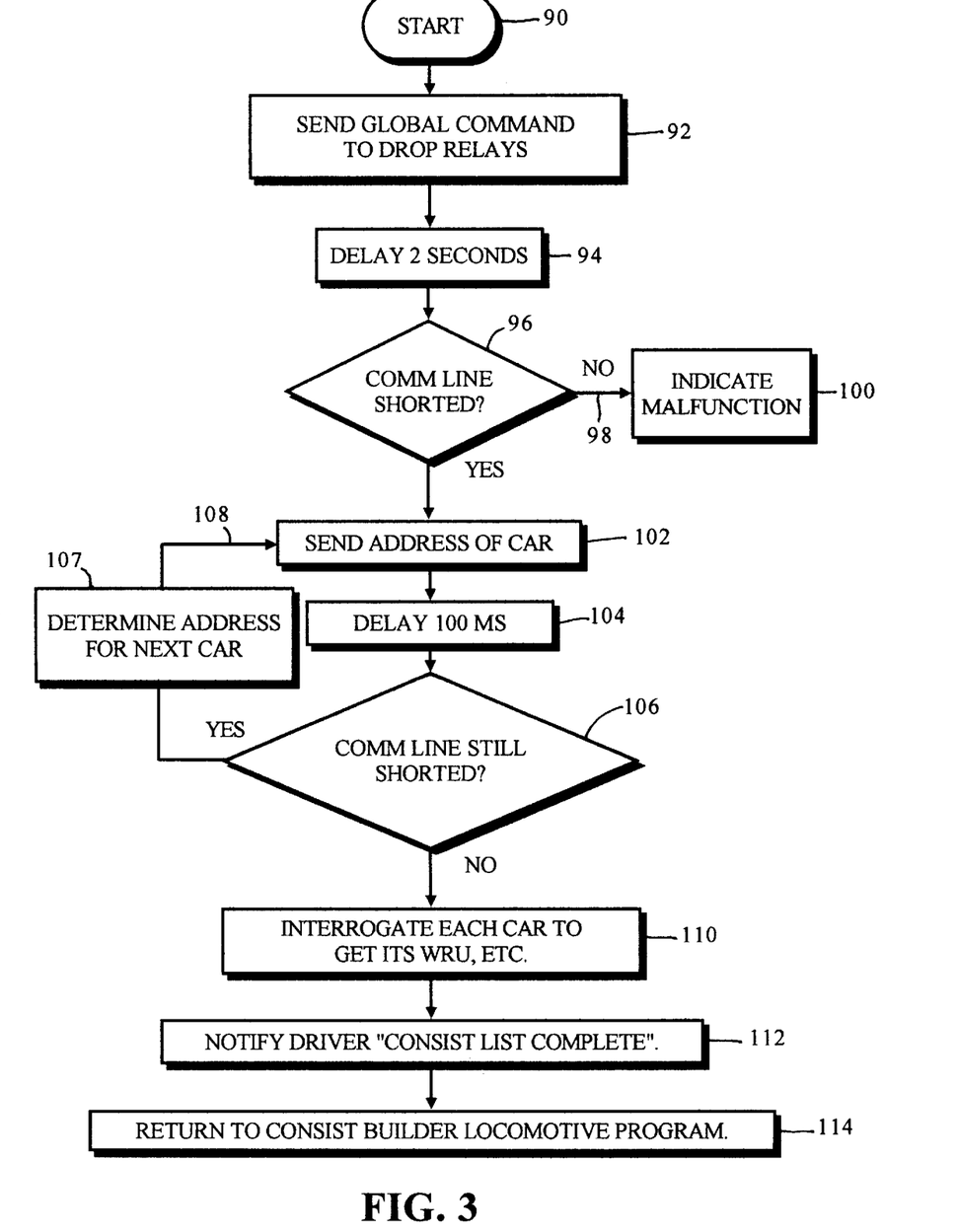
FIG. 3 is a flowchart showing the basic features of the logical operation of the portion of this invention which is located on the locomotive, for the embodiment shown in FIG. 1.

FIG. 3 illustrates the logical operation of the initialization routine for the controlling information processing unit 20. After starting at 90, the controlling information processing unit 20 sends a global command to drop relays to all the cars on the train, at 90. It then delays 2 seconds at 94, and tests to see whether the communication line is shorted. If the line is not shorted, it indicates the malfunction. If it is shorted, it sends an address for the car***

Figure 4:
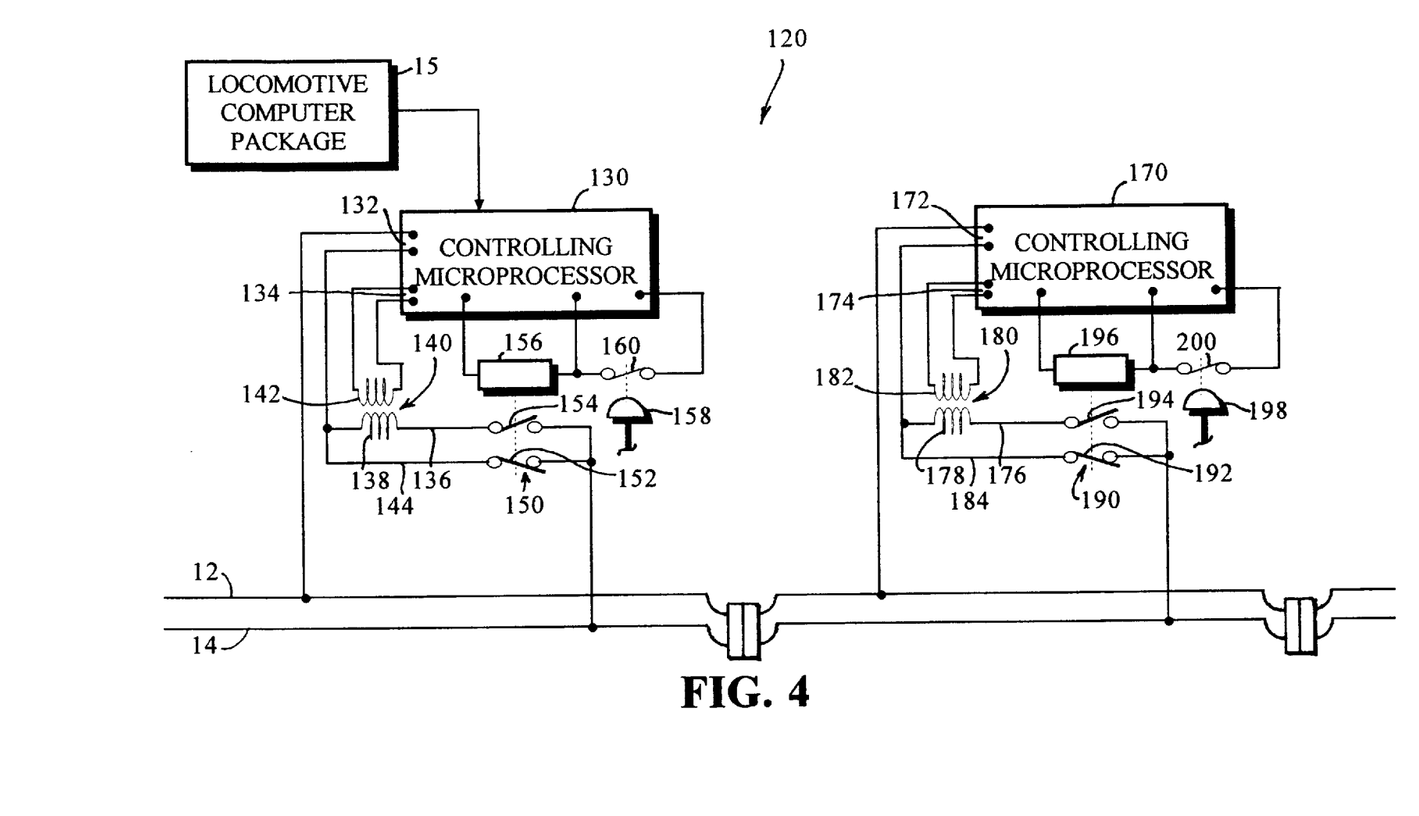
FIG. 4 is a schematic illustration of a second embodiment of the invention.

A second embodiment of the invention is schematically shown in FIG. 4. This embodiment does not require the filters 52 in the shunt paths which are required for the embodiment illustrated in FIG. 1.

In FIG. 4, as before, 12 and 14 are primary electrical conduction paths. The controlling microprocessor 130 is in communication with locomotive computer package 15. The controlling microprocessor 130 has voltage I/O terminals 132 and current I/O terminals 134. Current terminals 134 are connected to the secondary coil 142 of current transformer 140 which has primary coil 138. This transformer couples the current signal through terminals 134 to current on the shunt path 136. The shunt path 136 is completed through the upper moveable portion 154 of switch 150. Switch 150 also has a lower moveable portion 152. These moveable portions 152 and 154 are connected so that when one of the two closes its circuit, the circuit of the other is open. Current signals pas through the upper portion, 154 and voltage signals pass through the lower portion, 152. Hence, current signals on shunt path 136 are separated from voltage signals on path 144. Moveable portions 154 and 152 are moved by coil 156 which is controlled by the controlling microprocessor 130. Switch 160, which is controlled by brakepipe pressure switch 158 may optionally be used to cause the moveable portions 152 and 154 to drop in the event of low brakepipe pressure, such as an emergency brake application which would occur when the locomotive is parked. Such a condition signals a need for reinitialization of the system.

Subordinate microprocessor 170 is located on a railway vehicle (not shown) and connected to the controlling microprocessor 130 on the locomotive (not shown) by primary electrical conduction paths 12 and 14. Subordinate microprocessor 170, and various components connected to it, may optionally be physically identical to the controlling microprocessor 130 and to components connected to it.

The subordinate microprocessor 170 has voltage I/O terminals 172 and current I/O terminals 174. Current terminals 174 are connected to the secondary coil 182 of current transformer 180 which has primary coil 178. This transformer couples the current signal through terminals 174 to current on the shunt path 176. The shunt path 176 is completed through the upper moveable portion 194 of switch 190. Switch 190 also has a lower moveable portion 192. These moveable portions 192 and 194 are connected so that when one of the two closes its circuit, the circuit of the other is open. Current signals pas through the upper portion, 194 and voltage signals pass through the lower portion, 192. Hence, current signals on shunt path 176 are separated from voltage signals on path 184. Moveable portions 194 and 192 are moved by coil 196 which is controlled by the subordinate microprocessor 170. Switch 200, which is controlled by brakepipe pressure switch 198 may optionally be used to cause the moveable portions 192 and 194 to drop in the event of low brakepipe pressure, such as an emergency brake application which would occur when the railway vehicle is parked. Such a condition signals a need for reinitialization of the system.

Both the embodiment illustrated in FIG. 1 and the embodiment illustrated in FIG. 4 are similar in that the controlling microprocessors 20 or 130 establish communication one at a time with subordinate microprocessors 30 or 170. In both cases, the presence of a high shunt current provides information to the subordinate microprocessor 30 or 170 that the controlling microprocessor 20 or 130 is addressing it, in which case it receives an address from the controlling microprocessor 20 or 130.

The two systems differ in that the embodiment of FIG. 4 does not require filters 52 in the shunt paths, but does require the double pole switches 150 and 190. Also, the embodiment of FIG. 4, having the brakepipe pressure switch 200 is adapted for use in a controlled railway vehicle (not shown).

Both systems have the high frequency voltage signal for communicating large amounts of information, but only the embodiment of FIG. 4 has also a current signal of a digital type for communicating limited information such as address information.

In the embodiment of FIG. 1, the voltage signal is always available for all of the cars. In the embodiment of FIG. 4, the voltage signal is available only for the cars which have relays 190 in the up position to close the moveable portions 192.

Figure 5:
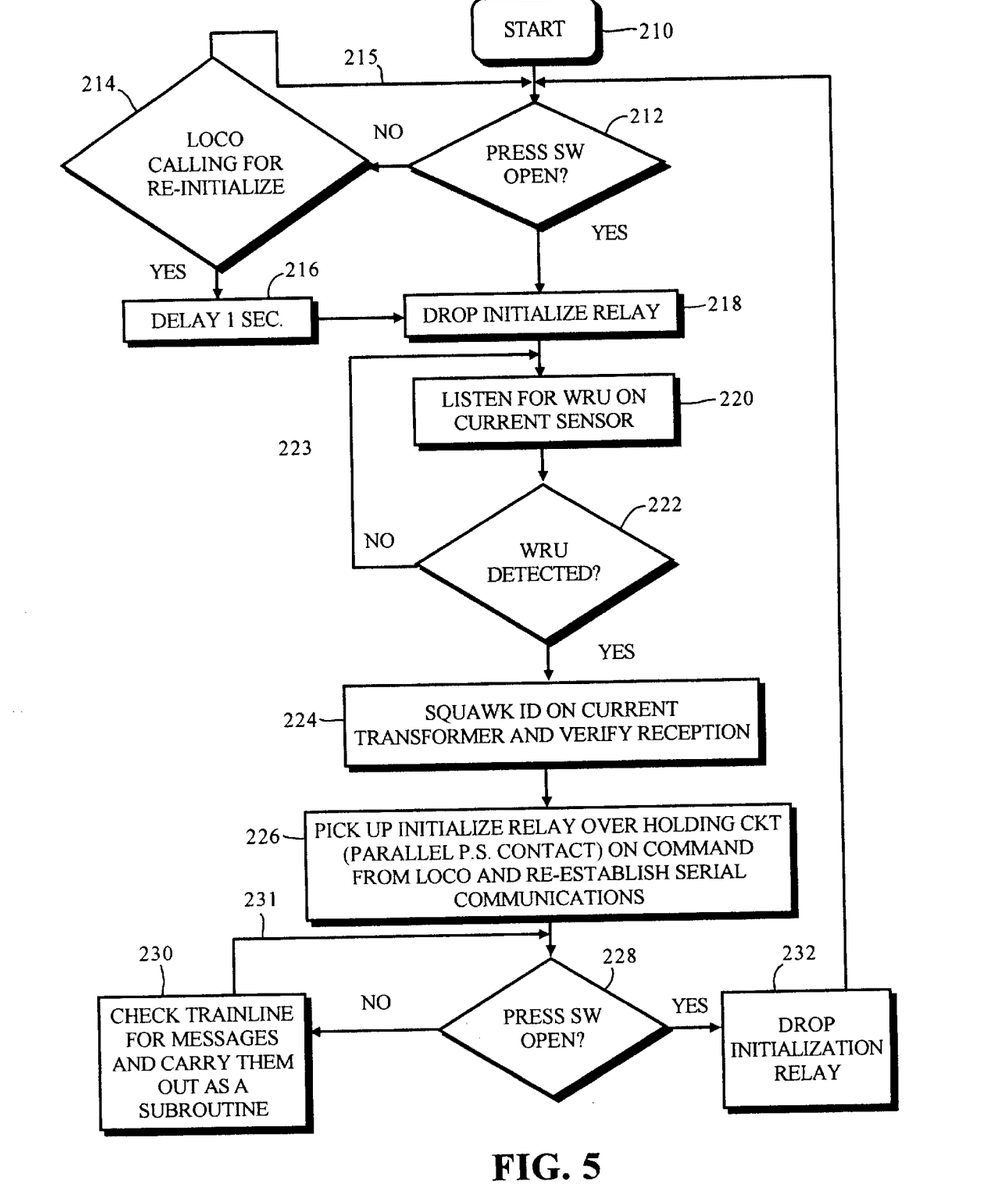
FIG. 5 is a flowchart showing the basic features of the logical operation of the carborne portion of this invention for the embodiment shown in FIG. 4.
Figure 6:
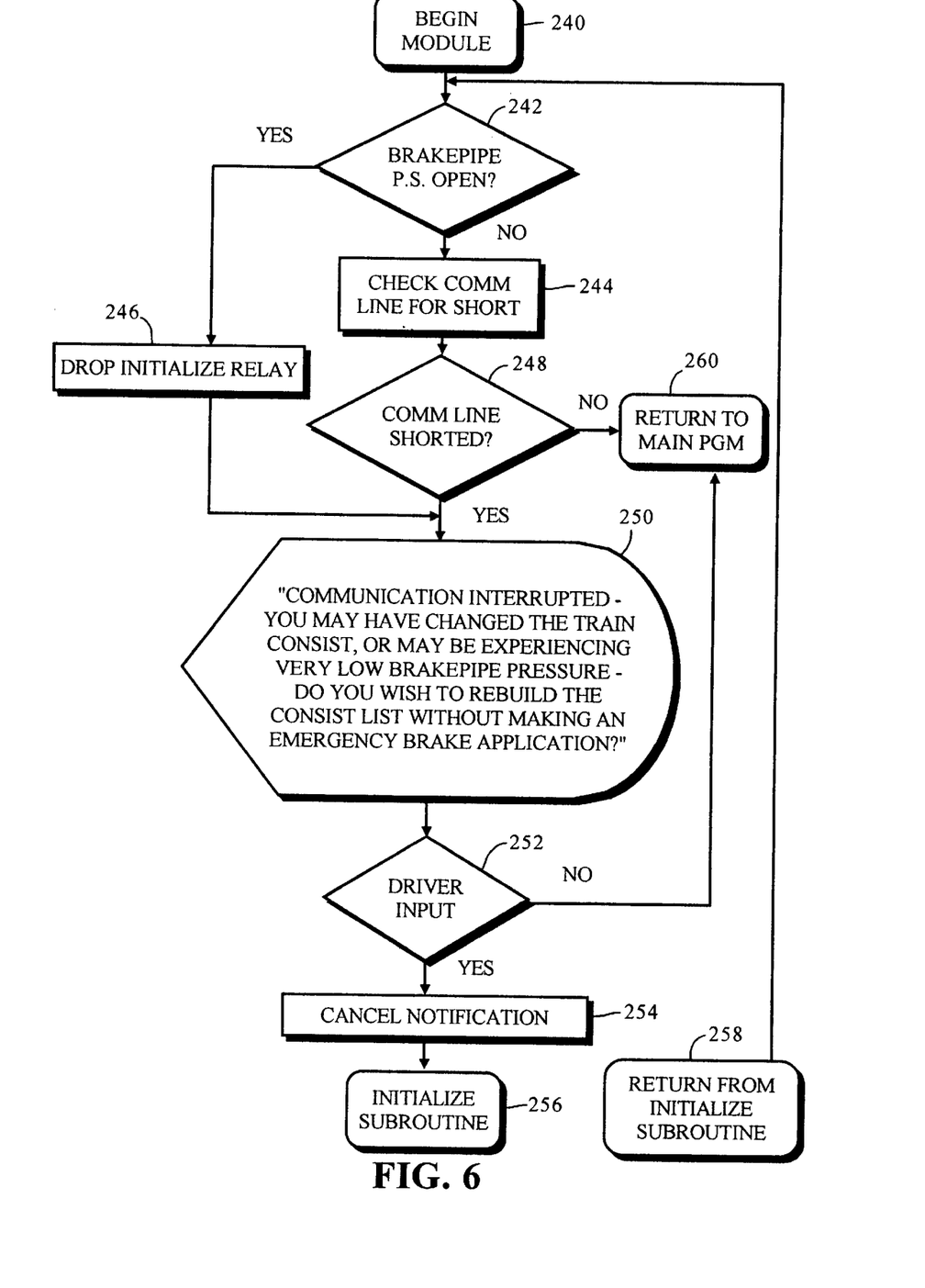
FIG. 6 is a flowchart showing the basic features of the logical operation of the procedure which determines whether initialization is required, for the portion of this invention which is located on the locomotive, in embodiment shown in FIG. 4.
Figure 7:
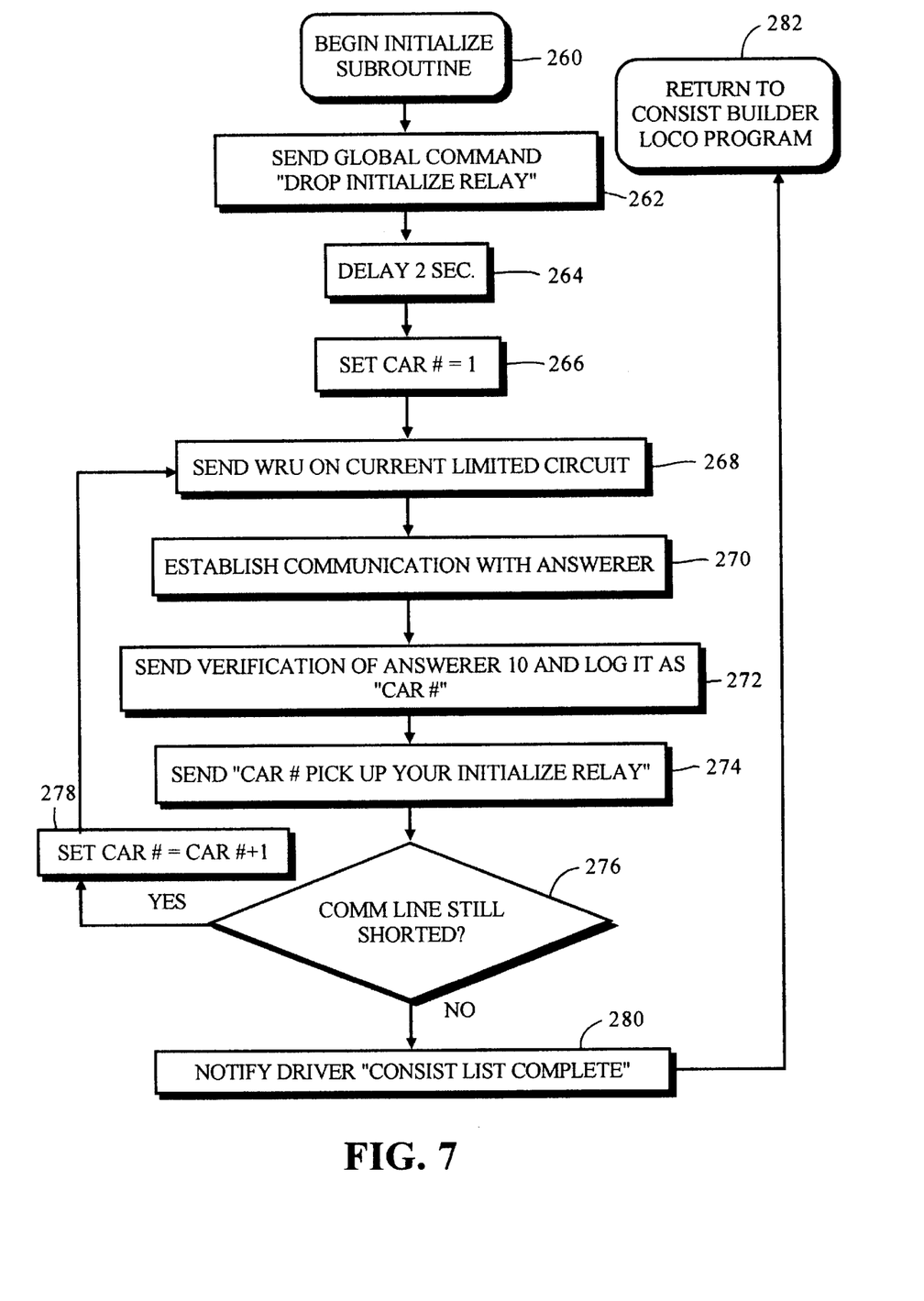
FIG. 7 is a flowchart showing the basic features of the logical operation of the initialization routine for the portion of this invention which is located on the locomotive, for the embodiment shown in FIG. 4.

The embodiment shown in FIG. 4 may be used in accordance with the flowcharts shown in FIGS. 5, 6, and 7.

FIG. 5 illustrates the logic to be followed by the subordinate microprocessor 170, for an installation on a railway vehicle. Entry point of the logic 210 is followed by a sensing of the brakepipe pressure switch at 212. If it is open, which indicates that the brakepipe is unpressurized, which occurs after an emergency brake application, or after the vehicle has been parked, then step 218 is performed, which drops the initialization relay. If step 212 indicates that the brakepipe pressure switch is not open, then it performs step 214, which is to determine whether the engineer in the controlling locomotive has requested reinitialization. If this is not the case, the logic goes by path 215 and returns to step 212. If in step 214, it is found that the engineer has requested initialization, then the system waits 1 second at step 216 and drops the initialization relay at step 218.

The subordinate microprocessor 170 then listens on the current transformer 180 at step 220 for a request for its WRU (the alphameric designator which identifies the controlled railway vehicle). If it does not receive the WRU request, it returns on path 223 and again tests for the request. When it does receive the request, it transmits its WRU on the current transformer, and verifies reception by the controlling microprocessor 130. It then picks up its initialization relay 190 and reestablishes serial communications in the voltage mode with the controlling microprocessor 130.

The subordinate microprocessor 170 then senses the output of the brakepipe pressure switch 200 at step 228. If brakepipe pressure switch 200 is not open, which indicates a pressurized brakeline, then it checks the trainline in voltage mode, responding either to global commands sent to all the subordinate vehicles, or to commands specific to it. It then returns by path 231 to step 228. If step 228 indicates that the brakepipe pressure switch is open, which indicates an unpressurized brakepipe, then it drops the initialization relay in step 232 and returns to step 21.

FIG. 6 is a flowchart of the routine in the controlling microprocessor in the locomotive or other controlling railway vehicle which determines whether initialization is necessary. Entering at 240, the logic determines in step 242 whether the brakepipe pressure switch is open. If it is open, indicating an unpressurized brakepipe, then in step 246 it drops its own initialization relay and asks the engineer in step 250 whether he wants the consist list to be re-initialized. If he does not, then the logic exits from the routine at 260 and returns to the main program. If step 242 indicates that the brakepipe pressure switch is open, then it checks the comm line (which carries the current signal) for a short. If it is not shorted, then the logic returns at step 260 to the main program. If it is shorted, then the logic proceeds to step 250 and proceeds as indicated above.

FIG. 7 illustrates the logic of the initialization routine which is performed by the locomotive. This routine is called at step 256 in FIG. 6. The routine of FIG. 7 is started at entry point 260. In step 262, it then sends a global command to all the subordinate microprocessors to drop their initialization relays. It then sets a counter to indicate a sequence number for each car in the train, starting at #1. It sends a request for a WRU label from the car. In steps 270 and 272, it verifies communication with the car and logs the WRU label under the car's sequence number, and informs the car as to its sequence number. It then directs that car to pick up its initialization relay in step 274. It then determines whether the comm line is still shorted, which indicates that all the cars have not been initialized. If it is shorted, it sets the sequence number in the counter to the former sequence number plus one, and returns to step 268, thus looping to initialize all cars in the train. When, after one of these loops, it finds the comm line not shorted in step 276, it notifies the engineer that the consist list is complete in step 280 and returns at step 282 to the main program.

In both the embodiment shown in FIG. 1 and the embodiment shown in FIG. 4, it is necessary for the primary electrical conduction paths 12 and 14 between each pair of cars to have combined values which are sufficiently large in comparison to the resistance of the shunt paths 44 or 194 that a sufficient fraction of the current reaching the car on the primary electrical conduction paths is shorted to ground through the shunt path so that a significant portion of it does not flow to the adjacent car. Enough current must flow through the shunt path in a car when all relays in cars closer than it to the locomotive have been lifted that the shunt current is significantly in exceeds of the predetermined shunt current value, and furthermore, the portion of the current which flows to the subsequent car and through its shunt path is significantly less than the predetermined shunt current value.

The following numerical values are proposed for the various electrical quantities. First, the current produced by the generator in the locomotive should be a robust current signal, for example, one Ampere. For safety reasons, the voltage driving the current is clamped to have a value of no more than 74 Volts.

Further, for example only, primary electrical conduction paths 12 and 14 could be made of #12 wire, which has a resistance of approximately 1.75 Ohms per 1000 feet. Approximately 100 feet of wire may be needed for each conductor in a 50 foot freight car because the electronics including the shunt path may be located near one end of the car. Since either end of the car can be located closest to the locomotive, some minimum resistance is needed in either direction from the shunt path. Hence, the combined (series) resistance of the two primary electrical conduction paths between shunt conduction paths in two adjacent cars would be 2*100 feet*0.00175 Ohms/foot, which equals 0.35 Ohms. For a 150 car train, the resistance would be 52.5 Ohms, and the voltage needed to drive a one Ampere current is 52.5 Volts. This is significantly less than the clamping voltage of 74 Volts.

To ensure that most of the current will flow from the locomotive through the first closed shunt path, the resistance of the shunt path should be significantly less than the car-to-car resistance which is 0.35 Ohms. For example only, a value of 0.035 Ohms could be used for the maximum resistance of the shunt path.

The present invention may be used for a controlling locomotive to control controlled locomotives, as well as other railway vehicles. Global commands for locomotive control may be sent on the voltage signal. Locomotives would respond to such commands, other cars would ignore them. Individual locomotives could also be selectively addressed using the sequence number established during initialization. This is true for controlled locomotives either in the same consist of locomotives as the controlling locomotive, or in remote locomotives.

In some embodiments of this invention, all commands for locomotive control may be done by the present invention. However, since the prior art systems of locomotive trainlines used to communicate within a consist of locomotives already exists, such connections may still be used with the present invention. For sending of locomotive control signals to a consist of remote locomotives, the present invention would be used to send the commands to one locomotive in the consist. It then would send locomotive control commands to other locomotives in its consist by trainlines of the present art.

Now, discussing the invention more broadly, there is disclosed an apparatus for enabling a controlling information processing unit to communicate individually with a plurality of subordinate information processing units disposed sequentially along and connected to a pair of primary electrical conduction paths. The apparatus provides an initialization procedure to enable the controlling information processing unit to assign and transmit a unique address to each subordinate information processing unit, so that it can subsequently address each subordinate unit independently. The apparatus has an information communication channel connecting the controlling information processing unit to all of the subordinate information processing units. It has a signal output means connected to the information communication channel for placing signals on the information communication channel.

Each of the subordinate information processing units has a signal input means connected to the information communication channel for receiving signals from the information communication channel.

The controlling information processing unit has an electrical current generator connected to the pair of primary electrical conduction paths for placing an electric current on one of the pair of primary electrical conduction paths, while receiving the current as a return current on a second one of the pair of primary electrical conduction paths.

Each subordinate information processing unit is connected to a shunt electrical conduction path which connects each member of the pair of primary electrical conduction paths to the other. Each of the shunt electrical conduction paths includes a switch in series with an electrical current measuring means, which provides to the subordinate information processing unit a measurement of the shunt electrical current. The switch has an open position and a closed position, and is controlled by the subordinate information processing unit.

The subordinate information processing units have means for comparing the value of the shunt current with a predetermined value, and for generating a signal indicating that the shunt current exceeds the predetermined current value. The predetermined value has a magnitude such that only one of the shunt currents exceeds the predetermined value. This occurs for the shunt path for which the switch is closed, and which is closer along the primary electrical conduction paths to the electrical current generator than any other shunt electrical conduction path which has a closed switch.

The controlling information processing unit sends a unique address on the information communication channel through its signal output means. Each subordinate information processing unit receives its address through its signal receiving means, in accordance with the signal which indicates that its current exceeds the predetermined value. It then places its address in its memory or other information retaining means. It then opens the switch in its shunt path.

The controlling microprocessor then determines a time when the switch connected to the subordinate information processing unit has been opened, and then sends the address signal for the next subordinate information processing unit. In this manner, the apparatus places a unique address in the memory or other information retaining means of each of the subordinate microprocessors, so that the controlling microprocessor can individually address and communicate with any of the subordinate microprocessors.

It is desirable for the electrical current generator to provide a current which is stabilized so that the current value does not depend on the distance along the primary electrical conduction paths to the first closed shunt path. It is also recommended that its voltage be clamped at a safe value such as, for example only, about 36 Volts.

The primary electric current may either be a DC current or a low frequency AC current such as, for example only, about 30,000 Hz. The information communication channel may be provided by high frequency digital voltage signals, such as digital binary signals, placed on one or both of the pair of primary electrical conduction paths. These signals, for example only, may be in the megacycle frequency range.

Note that while either the unique identifier for each car assigned by the Association of American Railroads, or the temporary identifier of the car by location in the train (1st car, 34th car, etc.) could be used, since both are logged into the controlling unit's memory. As a practical matter, however, the temporary address will be used because, since it must only identify one out of, typically no more than about one hundred fifty cars, this will be a much easier address to use. There are more or less three million pieces of rail equipment in North America requiring an address length of 22 binary digits as opposed to only 8 such digits if local addressing is used, assuming that no train would have more than 256 cars.

Further, in queuing the consist for trouble, after a global inquiry sent to all the cars results in an affirmative response, a much simpler algorithm is possible for identifying the individual car having trouble. This may be done by dividing the entire train in half, and globally polling say, the first half. Cars in that portion which have an exception to normal operation respond simultaneously. If the controlling microprocessor receives a signal, then it is established that trouble exists in the first half. If it does not, then the trouble detected on the signal sent to all the cars must be located in the second half of the train. The portion known to have a car with trouble can itself then be divided in half, and, say, the first half of that portion globally polled. This may be repeated until it is known which individual car has trouble. In this manner, one car having trouble can be identified in eight polling cycles.

The primary electrical current and the voltage signal may have frequencies which can be separated from each other either by a low-pass filter, a high-pass filter, or a tuned filter.

The voltage signal may optionally be prevented from being shorted out through the shunt electrical conduction paths by low pass or tuned filters placed in the shunt electrical conduction paths.

In one embodiment of the invention, the information communication channel has two modes, a voltage mode and a current mode. In this case, the subordinate microprocessor communicates with the controlling microprocessor in current mode when the switch in its shunt electrical conduction path is closed, and no other subordinate microprocessor between it and the controlling microprocessor has a closed shunt path. At such time, it is the only subordinate microprocessor having current mode communications with the controlling microprocessor, so it can receive commands sent to it individually by the controlling microprocessor. After it receives an address from the controlling microprocessor, it can receive commands sent to it individually in voltage mode, in response to its address, sent with the command. All of the subordinate microprocessors, at any time, can receive global commands sent to all the subordinate microprocessors in voltage mode.

In some embodiments, the apparatus has a second switch, which is open when the first switch is closed, and closed when the first switch is opened. The second switch is placed in a path from the subordinate information processing unit to the information communication channel so that the voltage mode is disabled when the current mode is in operation, and the current mode is disabled when the voltage mode is in operation. The signal sent from the controlling microprocessor to the subordinate microprocessor which informs it of its address may be sent in either current mode, or in voltage mode.

Each subordinate information processing unit may have a signal output means for placing signals from the subordinate information processing unit onto the information communication channel, in which case the controlling information processing unit has a signal input means for receiving signals from the information communication channel.

In some embodiments, means are provided for the controlling information processing unit to place a signal on the information communication channel which defines an address of one of the subordinate information processing units, and with it a signal indicating a request for information about the subordinate information unit. It may, for example, request information regarding the description of the subordinate information processing unit, an identification label for the subordinate information processing unit, a description of equipment to which the subordinate information processing unit is connected, or an identification label for the equipment to which the subordinate information processing unit is connected.

In response to such a request, the subordinate information processing unit may respond by transmitting a signal through its signal output, the signal indicating a description of itself, or its identification label, or a description of equipment to which it is connected, or an identification label for equipment to which it is connected.

Since addresses are sent to the subordinate information processing units in sequence, and since, after each subordinate unit receives its address, it takes a finite time for the switch in its shunt path to open, the controlling information processing unit must not send the address for any subordinate unit too early, before the switch in the path of the previous subordinate unit has been opened. A timer in the controlling unit may be used to ensure that sufficient time elapses between the sending of successive addresses. In lieu of this, each subordinate unit may transmit a signal defining itself or equipment to which it is connected as soon as it receives an address. The controlling unit waits to receive that signal before it sends an address to the next subordinate unit.

The controlling information processing unit may be mounted on a controlling locomotive in a consist of coupled railway vehicles, each of which has a subordinate information processing unit which is, for at least some functions, controlled by the controlling information processing unit.

For a railway application, the primary electrical conduction paths may be cables which extend down the length of all the railway vehicles, and are coupled to corresponding cables by connections between adjacent railway vehicles. Optionally, one of these cables may be a ground return path which passes through the frames of the railway vehicles, the wheels, and the railroad tracks. Vehicle to vehicle connection of this ground path may also occur through the couplings which join adjacent cars. A grease film in the bearings may interfere with ground path connections passing through the wheels, but some metal to metal contact may be provided by the bearing seals.

A test of such a ground return path has been performed on a 75 car train of unloaded coal hopper cars on a very bad stretch of track. A surprisingly good ground connection was obtained. The connection had some resistance variations, but a connection was provided at almost every instant of time over a period of 14 hours and 150 miles of operation of the special train with which these tests were made.

The address which the controlling unit sends to each subordinate unit may be a number indicating the position of the subordinate unit along the primary electrical conduction paths. An address of 1 may be assigned to the unit closest to the controlling unit, an address of 2 to the next unit, etc. For the railway application, an address of 1 may be assigned to the subordinate unit in the vehicle coupled to the locomotive, and address of 2 to the next vehicle, etc.

In another embodiment of this invention, the controlling information processing unit is a central processor unit of a computer, and the subordinate information processing units are connected to a bus of the central processor unit. In this embodiment, the address is a signal indicating a binary signal for application to address lines of the bus of the computer to identify and address an individual subordinate information processing unit.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

I claim:

1. An apparatus for enabling a controlling information processing unit to communicate individually with a plurality of subordinate information processing units disposed sequentially along and connected to a pair of primary electrical conduction paths, said apparatus enabling said controlling information processing unit to assign and transmit a unique address to said subordinate information processing unit, said apparatus comprising:

(a) an information communication channel connecting said controlling information processing unit to said subordinate information processing units;

(b) said controlling information processing unit having a controlling information processing unit signal output means connected to said information communication channel for placing signals from such controlling information processing unit onto said information communication channel;

(c) each of said subordinate information processing units having a subordinate information processing unit signal input means connected to said information communication channel for receiving signals from said information communication channel into said subordinate information processing unit;

(d) an electrical current generator connected to said pair of primary electrical conduction paths, said electrical current generator controlled by said controlling information processing unit for placing a primary electric current on a first one of said pair of primary electrical conduction paths, while receiving a primary return current on a second one of such pair of primary electrical conduction paths;

(e) a plurality of shunt electrical conduction paths, each connected to a subordinate information processing unit and to said pair of primary electrical conduction paths, each of said shunt electrical conduction paths for conveying a shunt electrical current from said first one of such pair of primary electrical conduction paths to said second one of said such primary electrical conduction paths, each of said shunt electrical conduction paths including a switch in series with an electrical current measuring means, said electrical current measuring means providing a measurement of said shunt electrical current to said subordinate information processing unit, said switch having an open position and a closed position, said switch controlled by said subordinate information processing unit;

(f) comparison means disposed in each subordinate information processing unit for comparing said value of said shunt electrical current with a predetermined shunt current value, and for generating a first signal indicating that said shunt electrical current exceeds said predetermined shunt current value, said predetermined shunt current value having such magnitude that only one of said shunt electrical currents exceeds said predetermined shunt current value, said only one of said shunt electrical current values being for one of said shunt electrical conduction paths having said switch closed, and being closer along said primary electrical conduction paths to said electrical current generator than any other shunt electrical conduction path having a closed switch;

(g) address sending means disposed within said controlling information processing unit to create a unique address for said subordinate information processing unit, and to place a second signal indicative of said unique address on said information communication channel through said controlling information processing unit signal output means;

(h) address receiving means disposed within said subordinate information processing unit to receive said second signal through said subordinate information processing unit signal receiving means, and in response to said first signal to recognize said second signal as indicative of its own individual address, to place said second signal in an information retaining means in said subordinate information processing unit, and to open said switch connected to said subordinate information processing unit and;

(i) means for said address sending means to determine a time when said switch connected to said subordinate information processing unit has been opened, and to send said second signal for a next one of such subordinate information processing units after said switch has been opened;

whereby said apparatus provides for placement of a unique address in said information retaining means in each of said subordinate information processing units so that such controlling information processing unit can individually address and communicate with any of said subordinate information processing units.

2. An apparatus according to claim 1 wherein said electrical current generator has means to stabilize said primary electrical current, and a voltage clamp so the voltage cannot exceed a predetermined maximum.

3. An apparatus according to claim 1 wherein said primary electric current is one of a DC current and an AC current having a frequency less than about 30,000 Hz.

4. An apparatus according to claim 1 wherein said information communication channel utilizes as a communication path at least one of said primary electrical conduction paths.

5. An apparatus according to claim 4 wherein said information communication channel utilizes as communication paths both of such pair of primary electrical conduction paths.

6. An apparatus according to claim 5 wherein said information communication channel transmits information by a voltage signal on said pair of primary electrical conduction paths.

7. An apparatus according to claim 6 wherein said voltage signal is a digital voltage signal.

8. An apparatus according to claim 7 wherein said digital voltage signal is a binary digital voltage signal.

9. An apparatus according to claim 8 wherein said voltage signal has a frequency range higher than said primary electrical current.

10. An apparatus according to claim 9 wherein said primary electrical current and said voltage signal have frequencies which can be separated from each other by at least one of a low-pass filter, a high-pass filter, and a tuned filter.

11. An apparatus according to claim 10 wherein said voltage signal is prevented from being shorted out through said shunt electrical conduction paths by filters placed in said shunt electrical conduction paths.

12. An apparatus according to claim 6 wherein said information communication channel has two modes, a current mode and a voltage mode, said current mode in operation when said first switch on said shunt electrical conduction path is closed, and said voltage mode in operation when said first switch on said shunt electrical conduction path is opened.

13. An apparatus according to claim 12 further having a second switch, said second switch open when said first switch is closed, and said second switch closed when said first switch is opened, said second switch disposed in a path from said subordinate information processing unit to said information communication channel whereby said voltage mode is disabled when said current mode is in operation, and said current mode is disabled when said voltage mode is in operation.

14. An apparatus according to claim 12 wherein said second signal indicative of an address is sent in said current mode.

15. An apparatus according to claim 1 further having:
(1) a subordinate information processing unit signal output means for placing signals from said subordinate information processing unit onto said information communication channel; and
(2) a controlling information processing unit signal input means for receiving signals from said information communication channel into said controlling information processing unit.

16. An apparatus according to claim 15 further having:
(1) means disposed in said controlling information processing unit to place a third signal on said information communication channel, said third signal indicative of an address of a specific one of such subordinate information processing units and of a request for at least one of a description of said subordinate information processing unit, an identification label for said subordinate information processing unit, a description of equipment to which said subordinate information processing unit is connected and an identification label for said equipment to which said subordinate information processing unit is connected.

17. An apparatus according to claim 16 further comprising means disposed in said subordinate information processing unit to respond to said third signal by transmitting a fourth signal through said subordinate information processing unit signal output means, said fourth signal indicative of at least one of a description of said subordinate information processing unit, an identification label for said subordinate information processing unit, a description of equipment to which said subordinate information processing unit is connected and an identification label for said equipment to which said subordinate information processing unit is connected.

18. An apparatus according to claim 1 wherein said means for determining a time when said switch has been opened includes a timer activated after sending a previous second signal indicative of an address of a previous subordinate information processing unit.

19. An apparatus according to claim 1 wherein such controlling information processing unit is disposed on a controlling locomotive in a consist of coupled railway vehicles, and said subordinate information processing unit is disposed on a controlled railway vehicle in said consist.

20. An apparatus according to claim 19 wherein at least one of such pair of primary electrical conduction paths is an electrical cable connected from vehicle to vehicle through such consist of coupled railway vehicles.

21. An apparatus according to claim 20 wherein one of such pair of primary electrical conduction paths is a ground path passing through at least two of the following: at least one frame of such railway vehicles, at least one wheel of said railway vehicles, at least one bearing seal, at least one coupler of said railway vehicles, and at least one rail on which said vehicle travels.

22. An apparatus according to claim 19 wherein said unique address of said subordinate information processing unit is a number indicating a position in said consist of a vehicle on which said subordinate information processing unit is disposed.

23. An apparatus according to claim 1 wherein such controlling information processing unit is a central processor unit of a computer, said subordinate information processing unit is connected to a bus of said central processor unit, and wherein said address is indicative of a binary signal from said central processor unit, said binary signal for application to address lines of said bus to identify and address an individual subordinate information processing unit.

* * * * *